(12) United States Patent
Sakata et al.

(10) Patent No.: US 7,477,859 B2
(45) Date of Patent: Jan. 13, 2009

(54) IMAGE FORMING APPARATUS IN WHICH CUTTING MARK IS GIVEN TO IMAGE DATA

(75) Inventors: Satoshi Sakata, Hino (JP); Kazumichi Yamauchi, Hachioji (JP)

(73) Assignee: Konica Minolta Business Technologies Inc., Tokyo (JP)

( * ) Notice: Subject to any disclaimer, the term of this patent is extended or adjusted under 35 U.S.C. 154(b) by 363 days.

(21) Appl. No.: 11/314,566

(22) Filed: Dec. 21, 2005

(65) Prior Publication Data

US 2006/0210296 A1     Sep. 21, 2006

(30) Foreign Application Priority Data

Mar. 16, 2005   (JP) ............... 2005-075012

(51) Int. Cl.
    *G03G 15/00*   (2006.01)
(52) U.S. Cl. .......................... 399/82; 399/385
(58) Field of Classification Search ................ 399/82, 399/385
    See application file for complete search history.

(56) References Cited

U.S. PATENT DOCUMENTS

| | | | |
|---|---|---|---|
| 4,536,078 A | 8/1985 | Ziehm | |
| 5,631,747 A | 5/1997 | Farrell et al. | |
| 5,651,618 A | 7/1997 | Tamiya | |
| RE37,645 E | * | 4/2002 | Takahashi et al. ........... 399/366 |
| 2003/0179941 A1 | 9/2003 | Katsumaya | |

FOREIGN PATENT DOCUMENTS

| | | |
|---|---|---|
| JP | 08-241399 A | 9/1996 |
| JP | 09-109505 A | 4/1997 |
| JP | 09-197738 A | 7/1997 |
| JP | 11-034424 A | 2/1999 |
| JP | 2002-292831 A | 10/2002 |

* cited by examiner

*Primary Examiner*—David M Gray
*Assistant Examiner*—Ryan D Walsh
(74) *Attorney, Agent, or Firm*—Frishauf, Holtz, Goodman & Chick, P.C.

(57) ABSTRACT

An image forming apparatus includes: an image forming section that forms an image on a sheet on the basis of image data; a sheet discharge tray on which the sheet with the image that has been formed, is stacked; and a controller that controls image formation. The image forming apparatus has a one sided mode in which the image formation is carried out only on a one side of a sheet and a two sided mode in which the image formation is carried out on both sides of a sheet, and when the two sided mode is carried out, the controller controls to form an image as a composite image in which a cutting mark is attached to the image data for a first surface only or a second surface only of the sheet.

9 Claims, 7 Drawing Sheets

FIG. 6 (a)

IN CASE OF IMAGE FORMATION
ORDER : FROM 1ST PAGE AND
N = ODD NUMBER

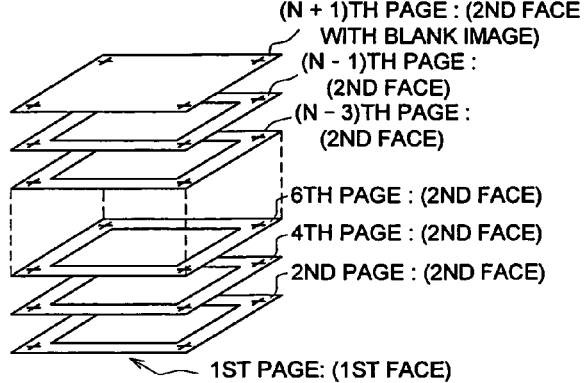

FIG. 6 (b)

IN CASE OF IMAGE FORMATION
ORDER : FROM 1ST PAGE AND N
= EVEN NUMBER

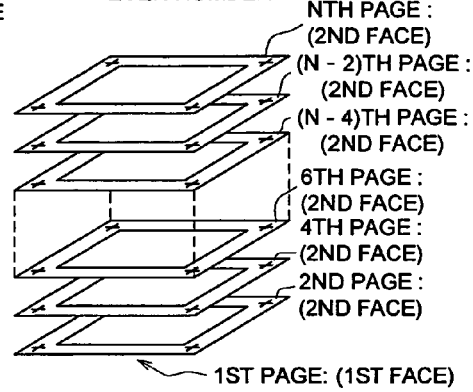

FIG. 6 (c)

IN CASE OF IMAGE FORMATION
ORDER : FROM NTH PAGE AND N
= ODD NUMBER

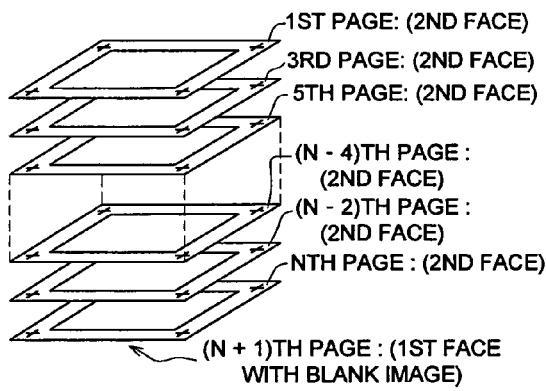

FIG. 6 (d)

IN CASE OF IMAGE FORMATION
ORDER : FROM NTH PAGE AND N
= EVEN NUMBER

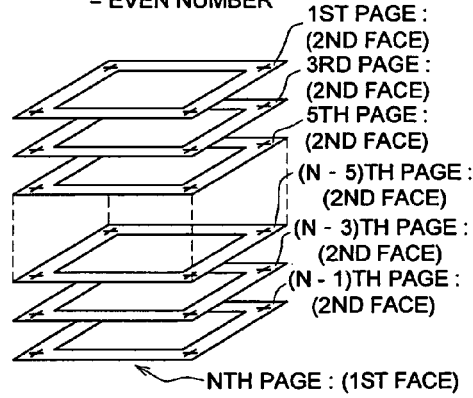

FIG. 7

| CUTTING MARK GIVING MODE TO ONE - SIDE FACE. SWITCHING TO TWO - SIDE FACE GIVING MODE IS POSSIBLE BY TWO - SIDE FACE CUTTING MARK SELECTION BUTTON. | | |
|---|---|---|
| CLEAR | SELECT ONE - SIDE FACE CUTTING MARK | ONE - SIDE FACE GIVING MODE OF CUTTING MARK IMAGE FORMATION ORDER : FROM 1 TO N PAGE CUTTING MARK: GIVEN TO UPPER FACE |
| DETERMINE | SELECT TWO - SIDE FACE CUTTING MARK | |

IMAGE FORMING APPARATUS IN WHICH CUTTING MARK IS GIVEN TO IMAGE DATA

This application is based on Japanese Patent Application No. 2005-075012 filed on Mar. 16, 2005, which is incorporated hereinto by reference.

BACKGROUND OF THE INVENTION

The present invention relates to an image forming apparatus that carries out image formation after adding a cutting mark indicating the cutting position to the image data using which the image formation is to be done.

In recent years, in image forming apparatuses, in some cases images are formed on sheets by attaching cutting marks indicating the position of cutting to the image data using which image formation is to be done. Because of this, it is possible to increase the efficiency of work since the work of cutting the sheets using a cutting machine becomes easy after the image formation has been completed.

Normally, cutting marks are made on all pages, that is, cutting marks are made on both sides of the sheet when forming images on both sides of the sheet (see, for example, Patent Document 1). In Patent Document 1, a document preparing apparatus has been disclosed that prints on single sheets of paper such as visiting cards, postcards, etc. In concrete terms, this is a technology in which one side of the sheet is taken as it is as the reference side during printing and the number of cutting operations is reduced. In the document preparing apparatus disclosed in Patent Document 1, the cutting marks are printed automatically on the pages on both sides of the sheet.

Therefore, when cutting marks are printed on both sides of the sheet, the positional relationship between the cutting marks that determine the cutting position is not matched but is shifted between the front and back surfaces of the sheet, if the cutting is done matching with the cutting mark printed on one surface of the sheet, then it is possible that the cutting mark printed on the other side of the sheet remains uncut. An unnecessary cutting mark which is an image other than the image data remaining on the sheet causes the problem of reduction in the image quality.

Further, in Patent Document 2, in the printing field, particularly in the imposition method of carrying out imposition operation of multiple layers of design images in order to prepare printing masters and in a voucher design system using such a method, an imposition method has been disclosed that has a setting process of setting the parameters of positioning marks. In terms of the concrete technical details, it has been disclosed that the type is set in the register mark setting screen indicating on which of the front and back surfaces is the register mark to be placed. In this technology, it is necessary for the user to select whether or not to place register marks and then make the specification, and hence the procedure is complicated. In addition, it is up to the user to determine on which of the front and back sides is the register mark to be placed, hence the register mark is placed on an arbitrary surface, and even the purpose of asking the user whether or not to place the register mark is merely for the sake of convenience of the user, and no concrete purpose has been considered.

Patent Document 1: Japanese Unexamined Patent Application Open to Public Inspection No. 9-109505

Patent Document 2: Japanese Unexamined Patent Application Open to Public Inspection No. 8-241399

However, in image forming apparatuses that form images using the electro-photographic method, investigations by the inventors revealed that a special problem occurs when cutting marks are placed on both sides of the recording sheet. That is, in the electro-photographic method, the image forming processes include a heating and pressure applying fixing process that fixes the toner image on the recording sheet by applying heat and pressure. Because the water content in the sheet evaporates due to being heated and also the fiber structure constituting the sheet becomes soft when the sheet is heated during this heating and pressing process, there is the phenomenon that the sheet shrinks after the heating and pressing fixing process. When forming images on both sides of the sheet, even when images of the prescribed size are formed on the front surface, because of the shrinking phenomenon of the sheet, the sheet and the formed image will have a slightly reduced size. Next, during the formation of images on the back surface, when image forming is done under the same conditions on the second surface of the sheet having a reduced size image formed on a reduced size first surface, the size of the images on the first surface will be slightly smaller than the size of the images on the second surface. As a consequence, there will be a shift in the positions of the images on the first and on the second surfaces. When the images formed are cutting marks, basically there will be a shift in the position because of shrinking of the sheet during the fixing process, even if image formation is done at the same position in the front and back surfaces. When the cutting operation is made taking as reference the cutting marks on either the front surface or on the back surface, it is possible that the cutting mark that was not taken as the reference remains on the sheet after cutting, and hence the image quality goes down.

Furthermore, in the case when the problem described above could be solved, when a plurality of sheets on which image forming has been completed are stacked on the sheet discharge tray in the image forming apparatus, the user has to take the bundle of sheets by hand up to the cutting machine. At this time, if the surface on which no cutting marks have been formed is the upper surface facing upward of the bundle of sheets, the user has to turn that bundle of sheets upside down, and if the bundle of sheets contains several hundred sheets, it becomes difficult to turn upside down the bundle of sheets easily, and hence the handing of the bundle of sheets becomes-complicated.

SUMMARY OF THE INVENTION

An object of the present invention is to provide an image forming apparatus with which it is possible to obtain high quality images while solving the problem, when cutting is made after carrying out image formation with cutting marks placed on both sides of the sheet, of cutting marks remaining on the sheet due to shift in the position of the cutting marks on the front and back surfaces of the sheet.

An object of the present invention is to provide an image forming apparatus with better easy of handling of the bundle of sheets stacked on the sheet discharge tray thereafter.

An aspect of the invention provides: An image forming apparatus including an image forming section that forms images on recording sheets based on image data, a sheet discharge tray for stacking on it sheets on which images have been formed, and a controller that controls image formation, and having the one sided mode in which images are formed only on one side of the sheets and the two sided mode in which images are formed on both sides of the sheets, the controller carries out control, when carrying out operations in the two sided mode, so that the image formation is done either only on the first surface or only on the second surface of the sheet of a composite image in which cutting marks have been added to the image data.

An another aspect of the invention provides: An image forming apparatus including an image forming section that forms images on recording sheets based on image data, a sheet discharge tray for stacking on it sheets on which images have been formed, and a controller that controls image formation, and having the one sided mode in which images are formed only on one side of the sheets and the two sided mode in which images are formed on both sides of the sheets, the controller carries out control, when carrying out operations in the two sided mode, so that the image formation of a composite image in which cutting marks have been added to the image data is done only when carrying out image formation on the surface which becomes the upper surface of the sheets discharged onto the sheet discharge tray.

BRIEF DESCRIPTION OF THE DRAWINGS

FIGS. 6(a) to 6(d) are schematic perspective views for explaining the relationship between the sequence of image formation and the surface on which cutting marks are attached which is a preferred embodiment of the present invention.

FIG. 7 is a display screen displayed in the display section of the operation section 39 according to a preferred embodiment of the present invention.

DETAILED DESCRIPTION OF THE PREFERRED EMBODIMENT

A preferred embodiment of an image forming apparatus according to the present invention is described below with reference to the attached drawings. However, the present invention shall not be limited to this.

Figure 1:
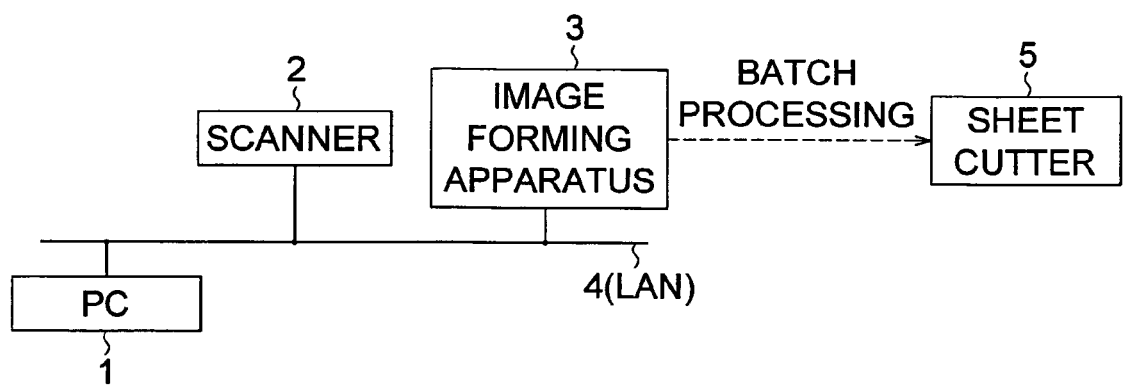
FIG. 1 is a block diagram for explaining the system configuration including an image forming apparatus according to a preferred embodiment of the present invention.

FIG. 1 is a block diagram for explaining the system configuration including an image forming apparatus according to a preferred embodiment of the present invention. This system includes a PC 1, a scanner 2, an image forming apparatus 3, a LAN 4, and a sheet cutter 5. Further, the image forming apparatus according to the invention can be only the image forming apparatus 3 or can be image forming apparatus 3 to which the function of a scanner 2 has been added.

The PC 1 is a personal computer that provides image information such as image data, number of pages of image formation, image forming sequence, etc., via LAN 4 to the image forming apparatus 3. The scanner 2 is a device that reads image data, and provides image information such as image data, number of pages of image formation, image forming sequence, etc., via LAN 4 to the image forming apparatus 3.

The image forming apparatus 3 employs the electro-photographic method and carries out image formation on sheet based on image information input from the PC 1 or from the scanner 2. The image forming apparatus 3 has the single side mode in which images are formed on the single side of the sheet and the two sided mode in which images are formed on both sides of the sheet.

The sheet cutter 5 carries out the cutting operation of sheets by cutting to a prescribed size the bundle of sheets output from the image forming apparatus 3. Here, the sheet cutter 5 reads the position of the cutting mark on the sheet (called a cutting mark or register mark), and cuts the sheets based on this position information. For example, the cutting is done at the positions of the crosswise shaped cutting marks printed in four corners of the sheet. Further, these cutting marks can be of different shapes depending on the type of sheet cutter 5 used. In addition, the sheets output from the image forming apparatus 3 are set in the sheet cutter 5 by an operator in a batch operation.

The LAN 4 carries out transmission and reception of image information between the PC 1, the scanner 2, and the image forming apparatus 3 using the CSMA/CD (Carrier Sense Multiple Access with Collision Detection) method.

Figure 2:
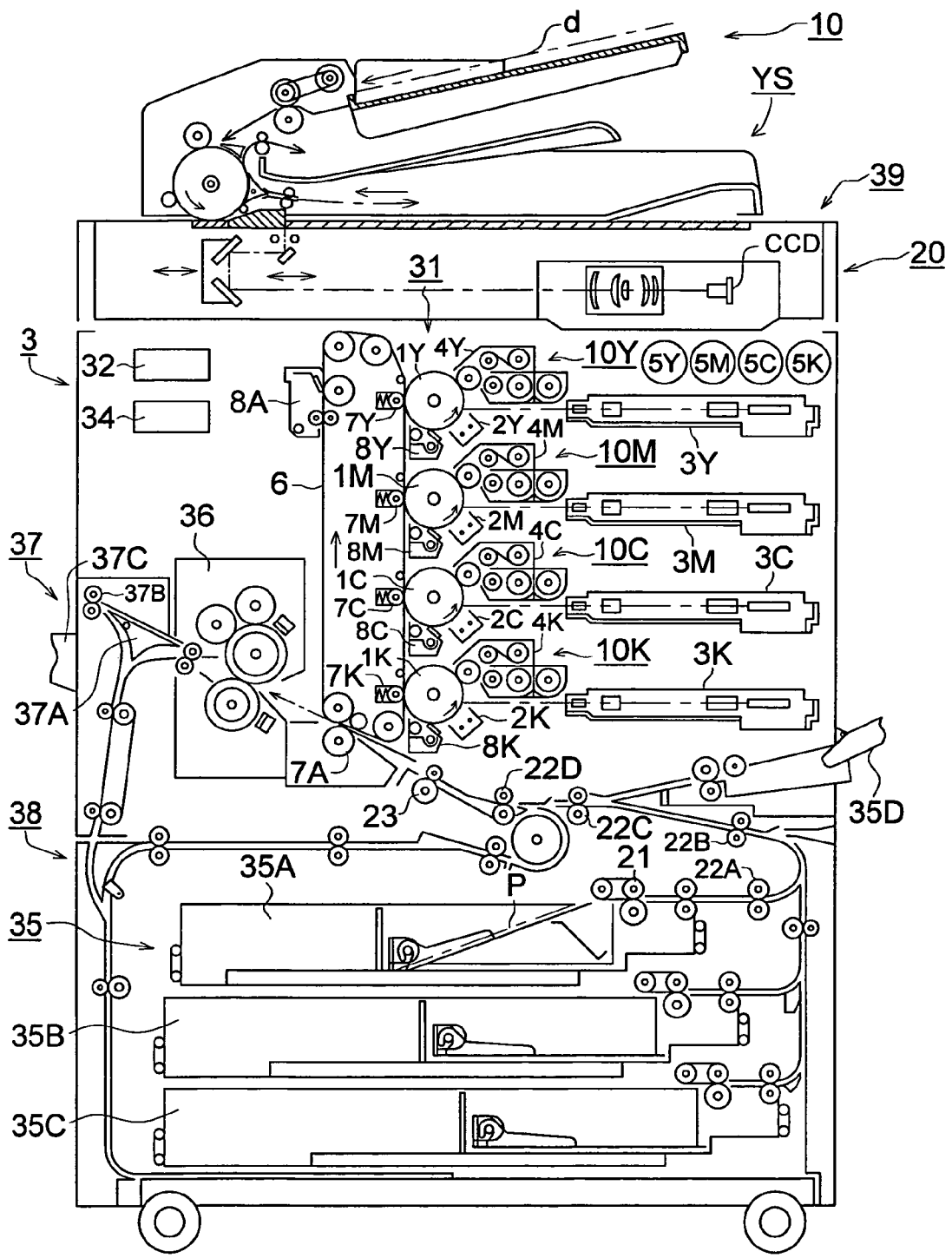
FIG. 2 is an overall configuration diagram of an image forming apparatus according to a preferred embodiment of the present invention.

FIG. 2 is an overall configuration diagram of a color image forming apparatus of the electro-photographic method capable of forming images on both sides of sheets and is an example of a preferred embodiment of the present invention. The color image forming apparatus 3 has the single side mode in which images are formed on the single side of the sheet and the two sided mode in which images are formed on both sides of the sheet.

In FIG. 2, the image forming apparatus 3 is of a so-called tandem type color image forming apparatus, and has an automatic document feeder 10, a document reading apparatus 20 having the scanner functions, an image forming section 31, an image processing section 32, image writing sections 3Y, 3M, 3C and 3K, a control section 34, a sheet feeding and conveying section 35, a sheet discharging section 37, a sheet discharging tray 37C and a re-conveying section 38 for carrying out automatic double sided copying. The image forming section 31 has plural sets of image forming sections 10Y, 10M, 10C and 10K, a belt-shaped intermediate transfer member 6, a sheet feeding and conveying section 35, and a fixing unit 36.

The image forming section 10Y that forms images of yellow color has a photoreceptor 1Y which is the image forming body, a charger 2Y, an exposure unit 3Y, a developing unit 4Y, and a cleaning unit 8Y all of which are arranged in the neighborhood of the photoreceptor 1Y. The image forming section 10M that forms images of magenta color has a photoreceptor 1M which is the image forming body, a charger 2M, an exposure unit 3M, a developing unit 4M, and a cleaning unit 8M all of which are arranged in the neighborhood of the photoreceptor 1M. The image forming section 10C that forms images of cyan color has a photoreceptor 1C which is the image forming body, a charger 2C, an exposure unit 3C, a developing unit 4C, and a cleaning unit 8C all of which are arranged in the neighborhood of the photoreceptor 1C. The image forming section 10K that forms images of black color has a photoreceptor 1K which is the image forming body, a charger 2K, an exposure unit 3K, a developing unit 4K, and a cleaning unit 8K all of which are arranged in the neighborhood of the photoreceptor 1K. The charger 2Y and the exposure unit 3Y, the charger 2M and the exposure unit 3M, the charger 2C and the exposure unit 3C, the charger 2K and the exposure unit 3K constitute the latent image forming section.

The intermediate transfer member 6 is an endless belt entrained about a plurality of rollers to be freely rotated.

The images of each color formed by the image forming sections 10Y, 10M, 10C and 10K are successively transferred (primary transfer) onto the intermediate transfer member 6 by the transfer units 7Y, 7M, 7C and 7K, whereby a synthesized color image is formed. The sheets P stored in the sheet feeding cassette 35A are fed by the sheet feeding unit 21, passes through the sheet feeding rollers 22A, 22B and 22C, and the registration roller 23, transferred to the transfer unit 7A, and the color image is transferred onto the sheet P (secondary transfer). The sheet P onto which color image has been transferred is fixed by applying heat and pressure in the fixing unit 36, gripped by the discharge rollers 25 and discharged and stacked onto the sheet discharge tray 26 outside the equipment.

On the other hand, after the color image is transferred onto the sheet P by the transfer unit 7A, the residual toner on the intermediate transfer member from which the sheet P has been separated is removed by the cleaning unit 8A.

References of 5Y, 5M, 5C and 5K are toner supply sections that supply fresh toner respectively to the developing units 4Y, 4M, 4C and 4K.

An image reading apparatus YS including an automatic document feeder 10 and a document reading apparatus 20 is provided on top of the image forming apparatus 3. The document "d" placed on top of the document table of the automatic document feeder 10 is conveyed by the conveying device, images on one side-or on both sides of the document are exposed in a scanning manner by the optical system of the document reading unit 20 and are read by a CCD line sensor.

After the analog signal obtained by photoelectric conversion by the CCD line sensor CCD is first subjected to the processing of analog processing, A/D conversion, shading correction, image compression, etc., in the image processing section, the signal is transmitted to the image writing sections (the exposure unit) 3Y, 3M, 3C and 3K.

The automatic document feeder 10 is provided with an automatic dual-sided document conveying device. Since this automatic document feeder 10 can read the contents of multiple sheets of the document "d" fed from the document loading table in one continuous operation sequence and can store the contents in a memory (the electronic RDH function), it is used because of its convenience when copying the contents of a large number of pages using the copy function or when transmitting a document d with a large number of pages using the facsimile function.

During the two sided mode, the sheet P that has had image formation done on its first surface and that has passed through the fixing unit 36 is sent to the re-conveying section 38 by the conveying path selection plate 37A, image formation is done again on its second surface in the image forming section 31, discharged to and stacked on the sheet discharge tray 37C by the sheet discharging roller 37B of the sheet discharging section 37.

Figure 3:
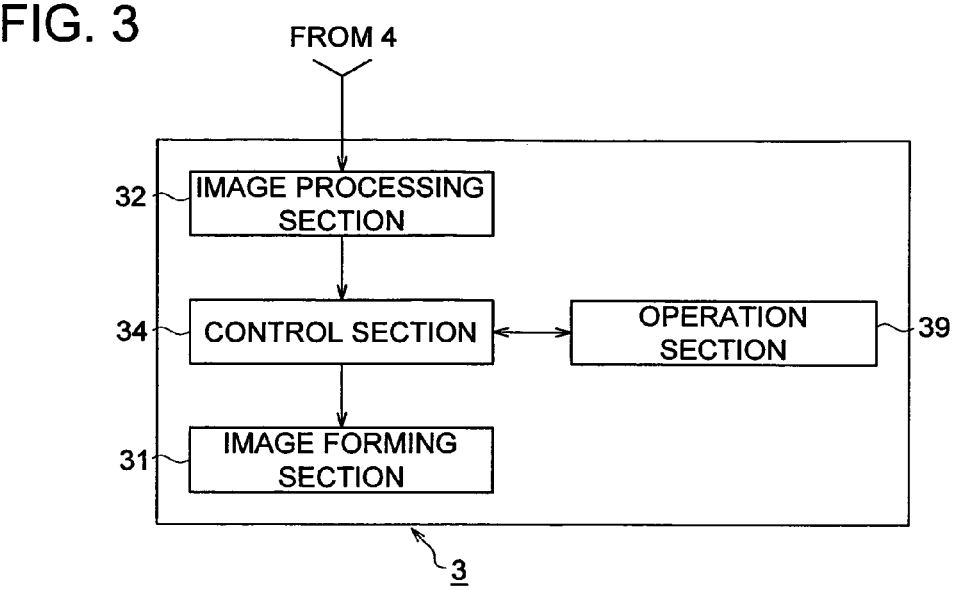
FIG. 3 is a functional block diagram showing the functional configuration of an image forming apparatus 3.

FIG. 3 is a functional block diagram showing the functional configuration of the image forming apparatus 3. The image forming apparatus 3 includes an image processing section 32, a control section 34, an image forming section 31 and an operation section 39. The image processing section 32 is composed of a computational processor, image memory, and interface, etc., and takes in the image information sent from the PC 1 or the scanner 2 via the interface connected to the LAN 4, and carries out image processing such as γ-correction, bitmap conversion, etc., at the time of outputting the image data within the image information.

The operation section 39 has a display section such as an LCD (Liquid Crystal Display), and an input section such as a touch panel and ten-keys, etc., using which it is possible to make various settings at the time of carrying out image formation. Further, even the setting of the cutting marks to be described later and the selection of the surface on which to attach the cutting marks are also made using this operation section 39.

The control section 34 includes a CPU, a memory, etc. and carries out comprehensive control of the image forming apparatus 3 based on the conditions set using the operation section 39. Further, the synthesis of the image data that has been input and the cutting marks to be described later is done in this control section 34 thereby generating the image in which cutting marks have been added.

Based on the image forming conditions instructed by the control section 34, the image forming section 31 feeds sheet P from the sheet feeding tray, forms images on this sheet P, and discharges it to and stacks it on the sheet discharging tray 37C.

Figure 4:
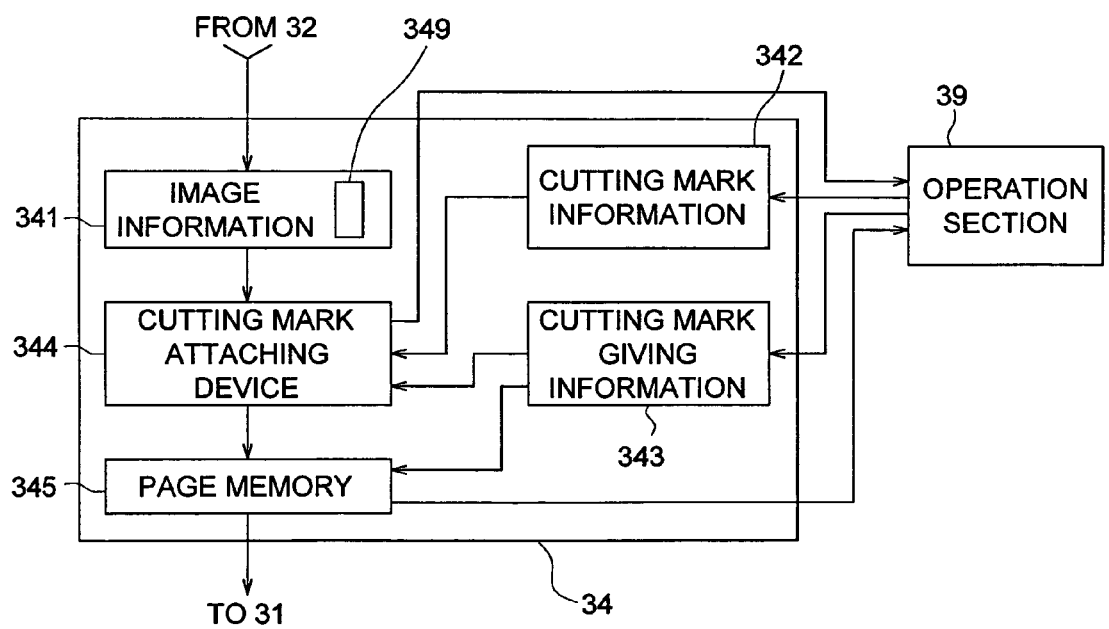
FIG. 4 is a functional block diagram of a control section 34 according to a preferred embodiment of the present invention.

FIG. 4 is a functional block diagram of the control section 34 according to a preferred embodiment of the present invention. The control section 34 includes the image information 341, the cutting mark information 342, the cutting mark attaching information 343, cutting mark attaching device 344, and the page memory 345. The image information 341 includes the image data 349. In the image processing section 32, image processing is carried out so as to obtain optimal image formation, and the image information 341 which includes the image data 349 and which is input from the control section 34 is sent to the cutting mark attaching device 344 within the control section 34.

On the other hand, upon operation using the operation section 39 the cutting mark screen for attaching cutting mark is called in the display section of the operation section 39, and next, the cutting mark information 342 is selected for selecting the cutting mark. In the present invention, there is the single side cutting mark attachment mode in which image formation is done using a synthesized image that cutting marks attached to the image data on only the first surface or on only the second surface of the sheet, and the double side cutting mark attachment mode in which the cutting marks are attached on both surfaces of the sheet. Once the cutting mark attaching information 343 is set in the cutting mark screen thereby deciding whether to attach the cutting marks on one side or on both sides, that information is transmitted to the cutting mark attaching device 344 and to the page memory 345.

The page memory 345 is a memory that stores the image data 349 which is output from the image forming section 31 and the image information 341 that is sent from the PC 1 or the scanner 2 and that includes the image forming conditions. The contents of this memory form the output information of image formation, and the image formation is carried out in accordance with the cutting mark information 342 and the cutting mark attaching information 343 that are specified from the operation section 39. In other words, the page in which the cutting mark is to be attached to the sheet P is determined within the control section 34 depending on the image information 341 and the cutting mark attaching information 343 which are input to the page memory 345, and this is instruction to the image forming section 31. Further, when the contents of the page memory 345 are to be stored within the control section 34, the contents of the page memory 345 are subjected to suitable image compression operation, and further supplied to image formation after carrying out image decompression when necessary. Further, the page memory 345 stores the blank sheet image data program that has been input beforehand and that can be used to form blank pages on sheet P.

The cutting mark attaching device 344 attaches cutting marks to the image data 349 based on the image information 341, the cutting mark information 342, and the cutting mark attaching information 343, and stores it in the page memory 345.

Figure 5:
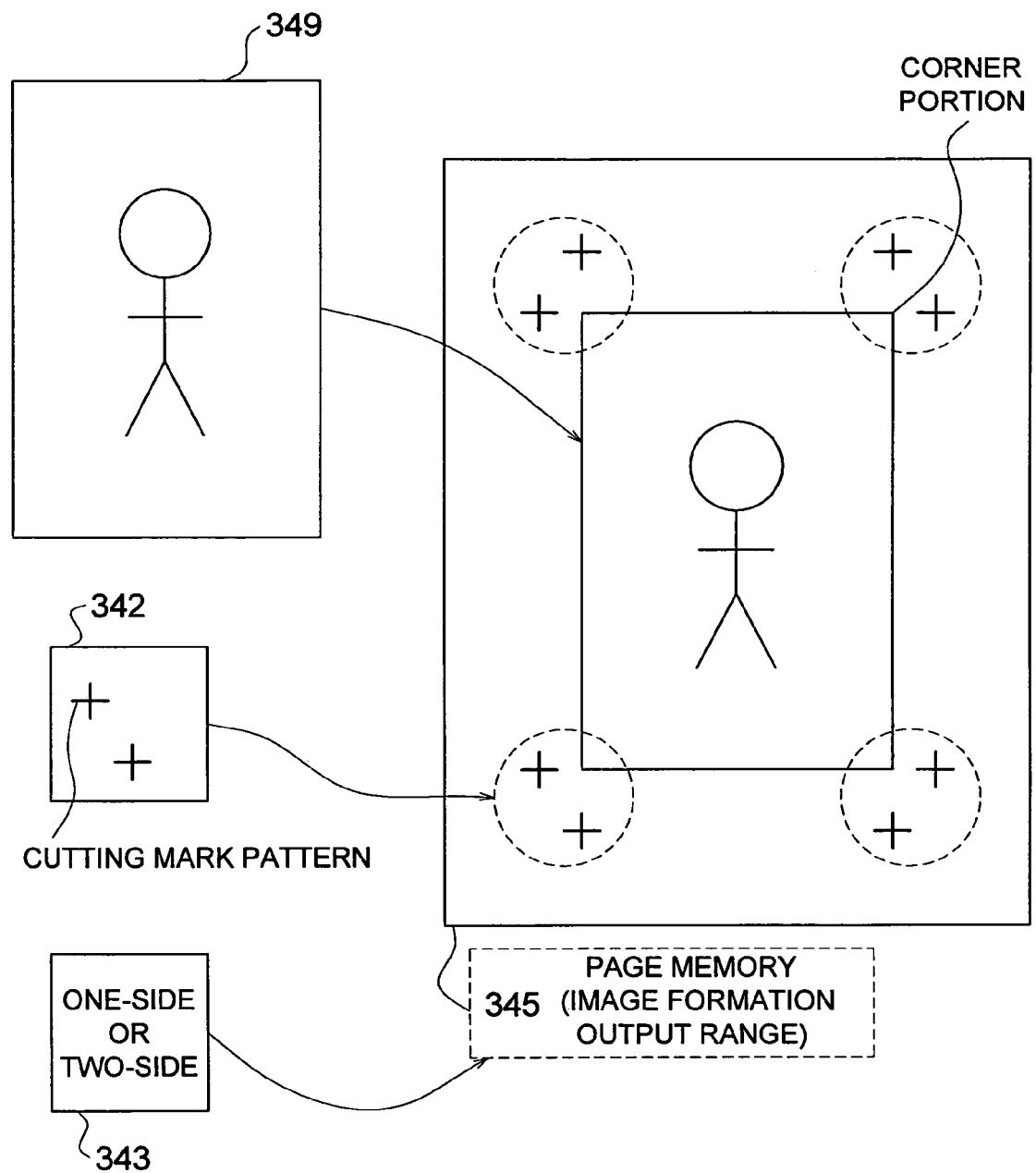
FIG. 5 is a diagram showing schematically the operation of attaching cutting marks using a cutting mark attaching device 344.

FIG. 5 is a diagram showing schematically the operation of attaching cutting marks using a cutting mark attaching device 344.

The image data 349 is placed at a prescribed position in the vicinity of the center of the page indicating the output region of image formation in the page memory 345 via the cutting mark attaching device 344 and the page memory 345 to which the image information 341, the cutting mark information 342, and the cutting mark attaching information 343 have been transmitted. The type of the cutting mark is selected by the control section 34 based on the cutting mark information 342, and the cutting mark position is determined from the four corner areas of the sheet. Subsequently, the cutting mark attaching device 344 attaches this cutting mark in the vicinity of the four corner areas in the image in the page memory 345 corresponding to the page set by the image information 341 and the cutting mark attaching information 343, and places it while optimizing the orientation and position.

Here, the cutting mark attaching device 344 determines the image data 349 to be placed in the output region of image formation in the page memory 345 and the image forming region of the cutting marks. Thereafter, the cutting mark attaching device 344 stops writing to the page memory 345 in the case in which this image formation region exceeds the output region of image formation of the page memory 345 which coincides with the sheet size, and transmits a warning signal to the operation section 39. Next, the operation section 39 receives this warning signal and carries out warning display in the display section.

FIG. 6(a) to FIG. 6(d) are schematic perspective views for explaining the relationship between the sequence of image formation and the surface on which cutting marks are attached which is a preferred embodiment of the present invention, and show schematically the state in which the sheets P on which image formation has been done are discharged to and stacked on the sheet discharge tray. The symbol N denotes the total number of pages of sheets P in the image forming conditions transmitted from the PC 1 or the scanner 2 via the LAN 4. The order of stacking the pages of sheets when carrying out image formation of N pages is either page 1 to page N or page N to page 1, and is determined by the sequence of image formation (hereinafter referred to as image formation sequence) set from the PC 1 or the scanner 2. The total number of pages N and the image formation sequence are input to the page memory 345 of image forming apparatus 3 via the LAN 4, and are stored there. Further, in the present invention, for every sheet P the surface on which image formation is done first is called the first surface, and the surface at the back of the first surface on which image formation is done next is called the second surface. In addition, in FIG. 6(a) to FIG. 6(d), the cutting mark attaching information 343 input from the operation section 39 indicates the status of stacking the sheets P when the cutting mark is attached only on one surface (on the upper surface).

The image formation sequence in FIG. 6(a) to FIG. 6(d) is controlled by the control section 34 that has received the input from the PC 1 and the scanner 2, and the determination of the $(N+1)^{th}$ page (to be described later) depending on whether the total number of pages N is an odd number or an even number and of the surface on which the cutting mark is to be attached is controlled by the instructions issued to the different sections of the image forming apparatus by the control section 34 that has received the image formation conditions input from the PC 1 and the scanner 2 and the cutting mark attaching information 343 input from the operation section 39.

FIG. 6(a) is a diagram showing the relationship between the status of discharge of sheets P and the attachment of cutting marks in the case when the total number of pages N is an odd number and the image formation sequence is starting from the first page and forming successively up to page N. In FIG. 6(a), image formation of the first page is made first on sheet P (the first surface), and the image formation of the second page is done next (the second surface). At this time, while the image formation of the cutting mark is made on the second surface, the sheet P having the $N^{th}$ page that is discharged at the uppermost position of the bundle of sheets on the sheet discharge tray will be a page with no cutting mark attached, since the $N^{th}$ page becomes the first surface (the lower surface) because N is an odd number. Since there will be a problem at the time of cutting the bundle of sheets in the cutting unit if there is no cutting mark on the sheet P that is discharged at the uppermost position, in the present invention, the control section 34, when N is odd, forms the $(N+1)^{th}$ page constituted using blank sheet image data on the second surface and attaches the cutting mark to this $(N+1)^{th}$ page.

FIG. 6(b) is a diagram showing the relationship between the status of discharge of sheets P and the attachment of cutting marks in the case when the total number of pages N is an even number and the image formation sequence is starting from the first page and forming successively up to page N. In FIG. 6(b), image formation of the first page is made first on sheet P (the first surface), and the image formation of the second page is done next (the second surface). At this time, while the image formation of the cutting mark is made on the second surface, the sheet P having the $N^{th}$ page that is discharged at the uppermost position of the bundle of sheets on the sheet discharge tray will be a page with cutting mark attached, since the $N^{th}$ page becomes the second surface (the upper surface) because N is an even number. Therefore, in this combination of the total number of pages N and image formation sequence there is no need to form the $(N+1)^{th}$ page.

FIG. 6(c) is a diagram showing the relationship between the status of discharge of sheets P and the attachment of cutting marks in the case when the total number of pages N is an odd number and the image formation sequence is starting from the $N^{th}$ page and forming successively up to the first page. In FIG. 6(c), image formation of the image data of the $N^{th}$ page is made first on sheet P, normally, since the page whose image formation is done first is taken as the first surface and becomes the lower surface, if N is an odd number, the odd pages become the lower surfaces, and since the first page that is discharged last becomes a lower surface there will be a problem at the time of completing the bundle of sheets. In the present invention, the control section 34, when N is odd, forms the $(N+1)^{th}$ page constituted using blank sheet image data on the beginning sheet taking it as the first surface, forms the $N^{th}$ page on its second surface, and attaches the cutting mark to this $N^{th}$ page. Because of this, the first page that is discharged last becomes the uppermost surface of the bundle of sheets and hence there will be no problem at the time of completing the bundle of sheets.

FIG. 6(d) is a diagram showing the relationship between the status of discharge of sheets P and the attachment of cutting marks in the case when the total number of pages N is an even number and the image formation sequence is starting from the $N^{th}$ page and forming successively up to the first page. In FIG. 6(d), image formation of the $N^{th}$ page is made first on sheet P (the first surface), and the image formation of the $(N-1)^{th}$ page is done next (the second surface). The image formation of the cutting mark is made on the second surface, the sheet P having the first page that is discharged at the uppermost position of the bundle of sheets on the sheet discharge tray will be a second surface (the upper surface) and will be a page with cutting mark attached. Therefore, in this combination of the total number of pages N and image formation sequence there is no need to form the $(N+1)^{th}$ page.

FIG. 7 is a display screen displayed in the display section of the operation section 39 according to a preferred embodiment of the present invention, and is the next screen displayed automatically in the display section when the cutting mark selection button is pressed in the display section initial screen, not shown in the figure, of the operation section 39, and shows the single-side cutting mark attachment mode which is the standard setting.

The top part of the display screen in FIG. 7 gives display of the status of the control section 34 or comments guiding the operation of the user, and the clear button to clear the information in the display screen, the cutting mark selection button for selecting whether to attach the cutting mark on one side or on both sides of the sheet, and the OK button that confirms the selection in the display screen or the execution of image formation are placed in the bottom left part of the display screen.

As a special application, when the user desires to attach cutting marks on both sides, although it is possible to press the double side cutting mark selection button and display a screen different from that shown in FIG. 7, explanation of that configuration is omitted here as it deviates from the purpose of the present invention.

Next, the operation of the image forming apparatus 3 centering on the control section 34 is explained here using FIG. 6(a) to FIG. 8.

Figure 8:
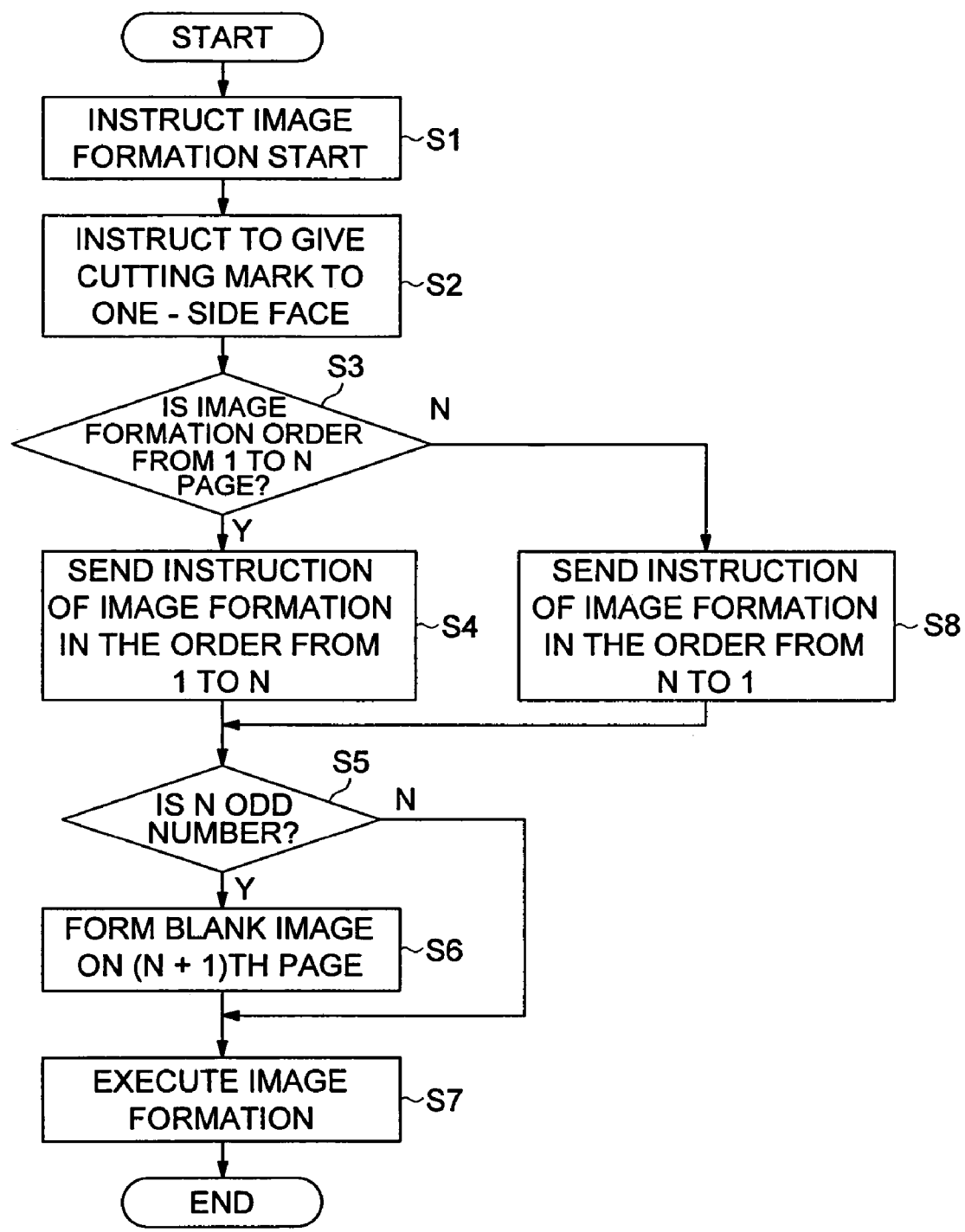
FIG. 8 is a flowchart explaining the operation when the mode of attaching cutting marks on a single surface is selected in an image forming apparatus 3 according to a preferred embodiment of the present invention.

FIG. 8 is a flowchart explaining the operation when the mode of attaching cutting marks on a single surface is selected in an image forming apparatus 3 according to a preferred embodiment of the present invention.

When the image formation start instruction is issued from the PC 1 or the scanner 2 (Step S1), the image formation start signal is sent to the control section 34 of the image forming apparatus 3 via the LAN 4, and the initial screen, not shown in the figure, is displayed in the display section of the operation section 39 (Step S2).

Next, the control section 34 calls the information of the image forming sequence stored in the page memory 345 and confirms whether or not the image forming sequence is from the first page to the $N^{th}$ page (Step S3). When the image forming sequence is from the first page to the $N^{th}$ page (YES in Step S3), the operation proceeds to Step S4 but jumps to Step S8 when the image forming sequence is not from the first page to the $N^{th}$ page (NO in Step S3). In Step S4, the control section 34 issues the image forming instructions to the image forming section 31 so that the image forming sequence is from the first page to the $N^{th}$ page (Step S4).

Next, the control section 34 verifies whether or not N is an odd number (Step S5), and if N is an odd number (YES in Step S5), the operation proceeds to Step S6, but jumps to Step S7 if N is not an odd number (NO in Step S5). In Step S6, the control section 34 calls the program of the blank sheet image data stored in the page memory 345 and issues the image forming instruction to form blank sheet image in the $(N+1)^{th}$ page, and the image forming section 31 forms a blank sheet image on the $(N+1)^{th}$ page (Step S6). At this time, the screen shown in FIG. 7 is displayed in the display section of the operation section 39.

Image formation is started when the operator presses the OK button in the screen shown in FIG. 7, based on the instruction from the control section 34, the image forming section 31 of the image forming apparatus 3 carries out image formation while attaching cutting marks only to the second surfaces of the sheets P (Step S7).

In Step S5, if N is not an odd number (NO in Step S5), the operation proceeds directly to Step S7, and the control section 34 does not issue the instruction of image formation of the $(N+1)^{th}$ page to the image forming section 31, but issues the instruction for executing the image formation of Step S7, whereupon the image forming section 31 carries out image formation with cutting marks attached only to the second surfaces of the sheets P based on the instructions from the control section 34.

In Step S3, if the image formation sequence is not from the first page to the No page (NO in Step S3), the operation proceeds to Step S8, and the control section 34 issues commands to the image forming section 31 to carry out image formation in the image formation sequence of $N^{th}$ to first page. Thereafter, the image formation is completed by carrying out the operations from Step S5 to Step S7.

In the preferred embodiment described so far, although the explanations given were for the case when the image formation is done for the sheets P in page sequence, in another preferred embodiment, even when the image formation sequence is not identical to the page sequence such as in booklets, it is also possible to have a configuration in which the cutting marks are attached only on the upper one side of the sheets P that are discharged, irrespective of the page sequence.

As another preferred embodiment of the present invention, the configuration and operation of attaching cutting marks only on the upper one side of the discharged sheets P is described here. Further, the image forming apparatus according to the present preferred embodiment uses the same numbers as those of the image forming apparatus whose configuration is shown in FIG. 2 to FIG. 5, but only the operation of the control section 34 is different, and hence detailed descriptions of the configuration and operation are omitted here.

In the image forming apparatus described in FIG. 2, when image formation is done on both sides of the sheet, after the image formation of the first surface is carried out, the sheet P that has passed through the fixing unit 36 is sent to the re-conveying section 37 by the discharge path selection plate 37A, the sheet is turned upside down and image formation is done on the second surface in the image forming section 31, and the sheet is then discharged to the sheet discharge tray 37C by the sheet discharging roller 37B of the sheet discharging section 37. Therefore, as is shown in FIG. 2, when images are formed on both sides of the sheet, sheets that have image forming done on their second surfaces will always be the upper surfaces on the sheet discharging tray 37C. In the present preferred embodiment, when the two sided mode is selected in the operation section 39, the control section 34 has a configuration in which it always gives instructions to the image forming section to attach cutting marks to the second surface, irrespective of whether or not the page sequence is identical to the image formation sequence.

Figure 9:
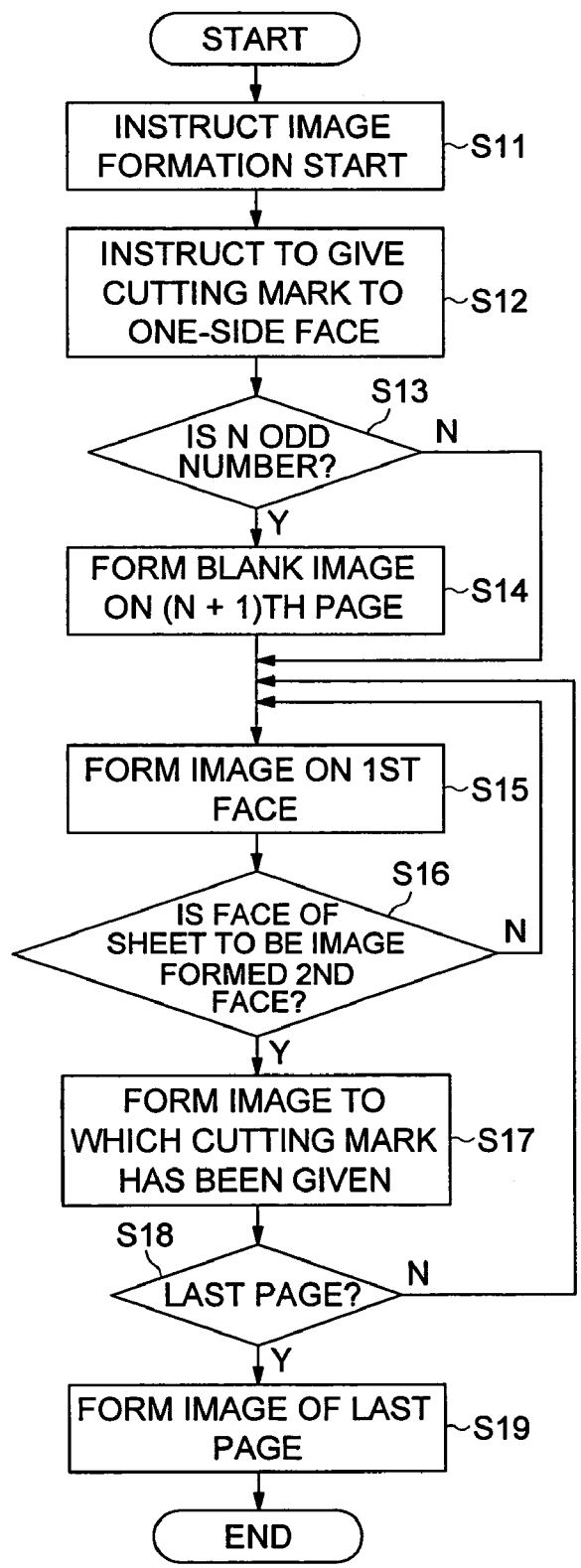
FIG. 9 is a flowchart explaining the operation when the mode of attaching cutting marks on an upper one surface of the sheet P is selected in an image forming apparatus 3 according to a preferred embodiment of the present invention.

FIG. 9 is a flowchart explaining the operation in a configuration in which cutting marks are attached on only the upper one surface of the sheet P in an image forming apparatus according to another preferred embodiment of the present invention.

When an image formation start instruction comes from the PC 1 or from the scanner 2 (Step S11), the image formation start signal is sent to the control section 34 of the image forming apparatus 3 via the LAN 4, and the initial screen is displayed in the display section of the operation section 39. The single-side cutting mark attachment mode is started when the single-side cutting mark selection button in the initial screen of the display section is selected (Step S12).

Next, the control section 34 verifies whether or not N is an odd number (Step S13), and if N is an odd number (YES in Step S13), the operation proceeds to Step S14, but jumps directly to Step S15 if N is not an odd number (NO in Step S13). In Step S14, the control section 34 calls the program of the blank sheet image data stored in the page memory 345 and issues the image forming instruction to form blank sheet image in the $(N+1)^{th}$ page, and the image forming section 31 forms a blank sheet image on the $(N+1)^{th}$ page (Step S14).

Next, the control section 34 carries out image formation without attaching cutting marks on the first surface of the sheet P on which image formation is to be made. (Step S15), and in addition, judges whether the sheet P coming subsequently is a first surface or a second surface (Step S16). If it is a second surface (YES in Step S16), the operation proceeds to Step S17, and if it is not a second surface (NO in Step S16), the operation returns to Step S15. When the surface on which image formation is to be done is a second surface, the control section 34 issues instructions to the image forming section 31, and the image forming section 31 carries out image formation with cutting mark attachment on the second surface of the sheet P (Step S17).

Next, the control section 34 confirms whether the sheet P coming next is the last page or not (Step S18), if it is the last-page (YES in Step S18), the operation proceeds to Step S19, and if it is not the last page (NO in Step S18), the operation returns to Step S15. When the sheet P is the last page, the image forming section 31 is made to carry out image formation of the last page (Step S19).

Although in the preferred embodiment described so far the configuration was one in which the cutting mark attaching device 344 was present within the control section 34, it is possible to have a configuration in which it is present in the image processing section 32 or in the image forming section 31.

As has been explained, by using an image forming apparatus according to the present invention, even when cutting operation is done of sheets on both sides of which image formation has been done, it is possible to provide a high quality image forming apparatus with the cutting marks not remaining on the images.

Furthermore, by attaching the cutting marks on one side of the sheet P, it is possible to suppress the generation of problems such as localized loads on image forming apparatuses unnecessary wear out of resource materials, or contamination inside the image forming apparatuses due to resource materials.

According to the present invention, by attaching cutting marks only on the first surface or on the second surface of sheets, it is possible to prevent the cuttings marks from remaining on the sheets after the cutting operation is done subsequent to image formation.

According to the present invention, when the output sequence of images starts from the first page, the last page of sheets discharged and stacked becomes the uppermost sheet of the stack, and since cutting marks are attached on the second surface of the uppermost sheet (the upper surface of the bundle of the stacked sheets), there is no need to turn upside down the bundle of sheets when taking it out from the image forming apparatus in which they are output and carrying to the cutting unit, and there is no generation of the problem of a stack of multiple sheets falling apart.

According to the present invention, even when the total number N of pages in the image data is odd, the last page that is discharged and stacked becomes the $(N+1)^{th}$ page which is the second surface of the uppermost sheet (the upper surface of the bundle of the stacked sheets), and since blank sheet image data and the cutting mark are attached to that $(N+1)^{th}$ page, there is no need to turn upside down the bundle of sheets when taking it out from the image forming apparatus in which they are output and carrying to the cutting unit, and the problem of a stack of multiple sheets falling apart gets reduced.

According to the present invention, when the output sequence of images starts from the $N^{th}$ page, since cutting marks are attached on the second surface of the uppermost sheet (the upper surface of the bundle of the stacked sheets), when taking it out from the image forming apparatus in which they are output and carrying to the cutting unit, the problem of a stack of multiple sheets falling apart gets reduced.

According to the present invention, when the output sequence of images starts from the $N^{th}$ page, even if the total number N of pages is odd, a page that becomes the $(N+1)^{th}$ page is formed on the other surface of a page one surface of which becomes the $N^{th}$ page, and by starting image formation from the $(N+1)^{th}$ page, it is possible to discharge the sheets always so that an odd page with cutting marks attached becomes the upper surface (the second surface).

According to the present invention, only when image formation is done on the surface of sheets that becomes the upper surface of the sheets discharged onto the sheet discharge tray, by, attaching cutting marks it is possible to discharge sheets always with the surface having cutting marks as the upper surface. Since the uppermost surface always has a cutting mark attached, there is no need to turn upside down the bundle of sheets when taking it out from the image forming apparatus in which they are output and carrying to the cutting unit, and there is no generation of the problem of a stack of multiple sheets falling apart.

According to the present invention, even when image formation is carried out using the electro-photographic process and fixing is done by a thermal fixing process, it is possible to provide a high quality image forming apparatus with the cutting marks not remaining on the images.

What is claimed is:

1. An image forming apparatus comprising:
   (a) an image forming section that forms an image on a sheet based on image data;
   (b) a sheet discharge tray on which the sheet with the image that has been formed is stacked; and
   (c) a controller that controls image formation, wherein the image forming apparatus has a one sided mode in which image formation is carried out only on one side of the sheet and a two sided mode in which image formation is carried out on both sides of the sheet, and wherein when the two sided mode is carried out the controller controls a composite image to be formed in which a cutting mark is attached to the image data for a first surface only or a second surface only of the sheet; and
   wherein when a total number of pages in the image data is N and image formation is carried out according to the image data starting from a first page successively up to an $N^{th}$ page, and when image formation is carried out first on the first surface and second on the second surface, the controller controls the cutting mark to be attached only to the image data for the second surface.

2. The image forming apparatus of claim 1, wherein the total number of pages N is an even number.

3. The image forming apparatus of claim 1, wherein when the total number of pages N is an odd number, the controller controls image formation so that a page that becomes an $(N+1)^{th}$ page is formed on the second surface of the sheet whose first surface becomes the $N^{th}$ page, and controls an image to be formed on the $(N+1)^{th}$ page based on a composite image on which a blank sheet image data and the cutting mark have been attached.

4. The image forming apparatus of claim 1, wherein the image formation is carried out using an electro-photographic method and includes a process of carrying out thermal fixing using a fixing unit.

5. An image forming apparatus comprising:
   (a) an image forming section that forms an image on a sheet based on image data;
   (b) a sheet discharge tray on which the sheet with the image that has been formed is stacked; and
   (c) a controller that controls image formation, wherein the image forming apparatus has a one sided mode in which image formation is carried out only on one side of the sheet and a two sided mode in which image formation is carried out on both sides of the sheet, and wherein when the two sided mode is carried out the controller controls a composite image to be formed in which a cutting mark is attached to the image data for a first surface only or a second surface only of the sheet; and
   wherein when a total number of pages in the image data is N and image formation is carried out according to the image data starting from an $N^{th}$ page successively back to a first page in reverse order, and when image formation is carried out first on the first surface and second on the second surface, the controller controls to the cutting mark to be attached only to the image data for the second surface.

6. The image forming apparatus of claim 5, wherein when the total number of pages N is an even number, the controller controls images to be formed starting from the $N^{th}$ page which becomes the first surface and successively in the reverse order.

7. The image forming apparatus of claim 5, wherein when the total number of pages N is an odd number, the controller controls image formation so that a page that becomes an $(N+1)^{th}$ page is formed on the second surface of the sheet whose first surface becomes the $N^{th}$ page, and controls an image to be formed on the $(N+1)^{th}$ page based on a blank sheet image data, and forms images starting from the $(N+1)^{th}$ page successively in the reverse order.

8. The image forming apparatus of claim 5, wherein the image formation is carried out using an electro-photographic method and includes a process of carrying out thermal fixing using a fixing unit.

9. An image forming apparatus comprising:
   (a) an image forming section that forms an image on a sheet based on image data;
   (b) a sheet discharge tray on which the sheet with the image that has been formed is stacked; and
   (c) a controller that controls image formation, wherein the image forming apparatus has a one sided mode in which image formation is carried out only on one side of the sheet and a two sided mode in which image formation is carried out on both sides of the sheet, and wherein when the two sided mode is carried out the controller controls a composite image to be formed in which a cutting mark is attached to the image data only on an upward facing surface of the sheet that is discharged onto the sheet discharge tray; and
   wherein when a total number of pages of the image data is N, and when one surface of the sheet on which image formation is carried out first is taken as a first surface and the other surface is taken as a second surface, and when the total number of pages N is an odd number, the controller controls image formation so that a page that becomes an $(N+1)^{th}$ page is formed on the second surface of the sheet whose first surface becomes the $N^{th}$ page, and controls an image to be formed on the $(N+1)^{th}$ page based on a composite image on which a blank sheet image data and the cutting mark have been attached.

* * * * *